United States Patent Office 3,011,917
Patented Dec. 5, 1961

3,011,917
PROCESS FOR PREPARING PERMANENTLY STIFFENED TEXTILES
Robert R. Dreisbach and John L. Lang, Midland, Mich., assignors to The Dow Chemical Company, Midland, Mich., a corporation of Delaware
No Drawing. Filed Feb. 16, 1956, Ser. No. 565,787
9 Claims. (Cl. 117—139.5)

This invention relates to a process for producing permanently stiffened textiles and to the stiffened fabric produced thereby. More particularly it relates to such a process that will produce a permanently stiffened fabric which is water swellable and may be restiffened by drying.

Stiffened fabrics find widespread use in the garment and allied trades. Examples of such usage are the stiffened fabrics employed in men's shirt collars and cuffs. The prior stiffening agents employed have been starch-like materials. The disadvantages of such materials have long been known to the housewife, who was caused to restiffen the collars and cuffs with fresh starch solution following every laundering. The garment industry has long desired a permanent stiffening agent for fabrics. However, such a stiffening agent must be swellable by water to become flexible so that the fabric may withstand the normal laundering and drying operations without permanent creasing, tearing, or wrinkling. Following laundering the stiffness must be capable of being restored to the fabric by a simple operation such as ironing.

The provision of a process for producing a permanently stiffened fabric is the principal object of this invention.

It is a further object to provide a permanently stiffened fabric which is rendered pliable when wet and is restiffened by drying.

The above and related objects are accomplished by means of a process whereby a fabric is impregnated with a polymeric proton acceptor, and a polymeric proton donor, dried after each treatment and set by subjecting the treated fabric to elevated temperatures. The water-swellable, thermoset stiffener allows the fabric to become pliable during laundering and yet will be restiffened upon drying. Additionally the stiffener will not migrate to unstiffened portions of the fabric and may be subjected to high temperatures such as those encountered in ironing, without melting or becoming plastic.

The polymeric proton acceptors that may be employed include those polymers having a proton accepting locus either as a substituent or as an integral portion of the polymer chain. As typical examples of useful proton acceptors may be mentioned polyvinylpyridine, polyvinylpyrrolidine, and polyallylcyanuric acid. The molecular weight of the polymer has little effect on the process although there are some practical considerations which could affect the choice that is made. Thus, if the molecular weight is extremely low, such as dimer, trimer, or tetramer, the amount of stiffening effect is too low to be of value. Additionally, when very low molecular weight polymers are used the permanence of the stiffener is lessened.

The polymeric proton acceptors may be prepared by any convenient method. A typical procedure is described in Fitzgerald and Fuoss, Ind. Eng. Chem., 42, 1603 (1950). In that procedure 4-vinyl pyridine was polymerized by an emulsion polymerization technique in an inert atmosphere using particular emulsifiers. The latex produced by that method is relatively unstable and the polymer may be filtered. The applicants have found that the above procedure may be altered to produce a more stable latex by polymerizing the vinyl pyridine at a temperature under 80° C. and employing ammonium persulfate as a catalyst. The polymer may be prepared by suspension or mass polymerization techniques without undue difficulty.

The polymeric proton donors which may be employed consist of any polymer having substituent groups which are proton donating or at least capable of giving a proton in aqueous solution. Typical examples of useful polymeric proton donors are the polymers and copolymers of acrylic acid and methacrylic acid, the copolymers of aconitic acid, crotonic acid, or other ethylenically unsaturated organic acid with a copolymerizable monomer, and sulfonated polystyrene, a typical example of a polymer having proton donating characteristics in aqueous solution is the copolymer of styrene and maleic anhydride.

Methods for the preparation of such polymeric proton donors are well-known in the art and include polymerization in emulsion, suspension, or mass. Some of such materials are commercially available and of those which are not, an investigator will be able to decide which polymerization procedure suits his particular situation.

The polymeric proton acceptor and the polymeric proton donor may be employed as an aqueous or organic solution or a latex and may be used by the same or different techniques. Aqueous solutions are convenient to prepare and to employ in the process and are preferred. Care should be taken in preparing the acidic aqueous solution of the polymeric proton acceptor that the acidic strength of the solution not be so great as to degrade the fibers. Latexes may be used, but since such latexes frequently cannot be stored for extended periods, the latexes must be freshly prepared before use, causing considerable inconvenience. An especially suitable technique is one wherein an organic solution of both the proton acceptor and the proton donor is prepared, where both are soluble in the same organic solvent, and the fabric is impregnated with that solution. That technique assures intimate contact between all of the proton acceptor and proton donor molecules without any reaction until the organic solvent has been removed and the fabric wet with water.

Following impregnation the treated fabric is dried. When the proton acceptor and proton donor are added sequentially the fabric is dried after each treatment. This drying may be a mere air drying since it is necessary only to prevent stripping of the first applied agent by the impregnation step of the second applied agent. Thus, the polymeric proton acceptors are soluble in the acidic media used to apply the polymeric proton donor and much of the proton acceptor would dissolve in such acidic media and be removed from the fabric before the fabric could be set. When the single organic solution of both agents is used as described above it is only necessary to dry the treated fabric to remove the organic solvent, then to wet the fabric with water, after which it is dried.

The final step in the process is the setting of the stiffening agent. That is accomplished by subjecting the treated fabric to an elevated temperature for short periods of time. The temperature and time employed may be any temperature and time which will not seriously degrade either polymer or the fibers. It has been found that exposure to a temperature of 150° C. for a normal ironing period will set the agent. The setting step assures reaction between the proton acceptor and the proton donor so that the stiffened fabric will be permanently stiffened and will then withstand repeated laundering and drying operations. If the setting step is omitted the treated fabric will withstand a few laundering and drying operations but in time will lose its stiffening and it will be necessary to repeat the stiffening process.

Fabrics stiffened in accordance with this invention become limp when wet with water because the stiffening agent is water swellable. This allows such fabrics to be laundered by normal laundering procedures without cracking, peeling, permanent creasing, or other difficulties which would result from a non-swellable stiffening agent. Following laundering the fabrics need only be dried to return to their stiffened condition. An additional advantage is that the stiffening agent is non-migratory even in the swelled condition and therefore the stiffened fabrics may be used contiguously to unstiffened fabrics without fear of the stiffening agent migrating to the unstiffened fabric.

The degree of stiffness obtained may be varied by varying the amount of each of the agents which is applied. This may be done either by varying the strength of the solutions or solids content of the latexes or by varying the length of time which the fabric is exposed to impregnation. If after one treatment the fabric does not have the stiffness desired it may be subjected to additional treatments until the desired stiffness is attained. It is preferred to arrive at the proper stiffness in a single operation, however.

The operation and advantages of the process of this invention will be apparent from the following illustrative examples wherein all parts are by weight.

*Example 1*

A latex of polyvinylpyridine was prepared by the following procedure: 10 parts of 4-vinyl pyridine was added to 90 parts of an aqueous solution consisting of 97.9 parts water, 0.1 part ammonium persulfate, and 2 parts of the disodium salt of t-butyl-o-phenyl phenol disulfonic acid, an emulsifier sold commercially as "Areskleen 400." The emulsions were polymerized with agitation at 50° C. of 16 hours and in the presence of a nitrogen atmosphere. After filtration the latex was found to have an evaporative solids content of about 10 percent.

Acrylic acid was polymerized in aqueous solution using ammonium persulfate as catalyst to produce a 5 percent solution of polyacrylic acid.

A sample of number 140 cotton sheeting was dipped into the latex prepared as described above, and was air dried. The sheeting was then passed through the 5 percent aqueous solution of polyacrylic acid and air dried. The sheeting was then subjected to a temperature of 150° C. with an iron. The treated sheeting was found to be stiff and relatively resistant to creasing.

The treated sheeting was washed in hot soapy water, scrubbed with a brush, dried, and ironed. The sheeting was compared for stiffness with an unwashed sample and found to have the same stiffness.

*Example 2*

A sample of number 140 cotton sheeting was treated in a manner similar to that of Example 1 using a 5 percent aqueous solution of polyvinylpyrrolidine partial hydrochloride and a 5 percent aqueous solution of sulfonated polystyrene. After drying and ironing the cloth showed the same stiffness qualities as that prepared in Example 1, and could be washed, dried, and reironed without losing its stiffness.

*Example 3*

A methyl ethyl ketone solution of polyvinyl pyridine and a copolymer of styrene and maleic anhydride was prepared. A sample of number 140 cotton sheeting was immersed in the solution and air-dried. The sheeting was then soaked in water for one hour, drained, and air dried. The sheeting was ironed at 125° C. and found to have a stiffness similar to that of the fabrics treated in Examples 1 and 2.

We claim:
1. A method which comprises impregnating a normally soft and pliable cotton fabric with a polymeric proton acceptor and an organic polyelectrolyte proton donor, drying the fabric after each treatment with such materials, and heating the fabric to set the impregnants therein and to stiffen the fabric permanently.
2. A method as claimed in claim 1, wherein the polymeric impregnants are applied sequentially.
3. A method as claimed in claim 1, wherein the polymeric impregnants are applied simultaneously.
4. A method as claimed in claim 1, wherein at least one of the polymeric impregnants is applied from aqueous emulsion.
5. A method as claimed in claim 1, wherein at least one of the polymeric impregnants is applied from aqueous solution.
6. A method as claimed in claim 1, wherein at least one of the polymeric impregnants is applied from non-aqueous solution.
7. A method as claimed in claim 1, wherein the proton acceptor is polyvinylpyridine.
8. A method as claimed in claim 1, wherein the proton donor is polyacrylic acid.
9. A method as claimed in claim 1, wherein the proton donor is a copolymer of styrene and maleic anhydride.

References Cited in the file of this patent
UNITED STATES PATENTS

| | | |
|---|---|---|
| 2,072,465 | Reppe et al. | Mar. 2, 1937 |
| 2,468,086 | Latham et al. | Apr. 26, 1949 |
| 2,468,716 | Nyquist et al. | Apr. 26, 1949 |
| 2,561,215 | Mighton | July 17, 1951 |
| 2,614,093 | Wheelock | Oct. 14, 1952 |
| 2,717,887 | Saner | Sept. 13, 1955 |
| 2,765,228 | Jordan | Oct. 1, 1956 |
| 2,794,010 | Jackson | May 28, 1957 |
| 2,807,597 | Sonnenfeld | Sept. 24, 1957 |
| 2,832,748 | Jackson | Apr. 29, 1958 |